March 6, 1928.

F. O. WELLS

NONSKID DEVICE

Filed March 3, 1927

1,661,280

INVENTOR,
Frank O. Wells,
BY
Harry M. Bown.
ATTORNEY.

Patented Mar. 6, 1928.

1,661,280

UNITED STATES PATENT OFFICE.

FRANK O. WELLS, OF GREENFIELD, MASSACHUSETTS.

NONSKID DEVICE.

Application filed March 3, 1927. Serial No. 172,319.

This invention relates to improvements in non-skid devices for attachment to the wheels of a motor vehicle and particularly to that part of the device that extends transversely across the tread portion of the tire and the ends of which device are attached to the usual side chains.

An object of the invention is to provide a non-skid device that will positively prevent the machine from skidding or moving sidewise relative to the line of motion of the vehicle and at the same time, effectually operate to propel the machine either forwardly or rearwardly. Heretofore, it has been a common practice to employ transversely disposed tire chains that are made up of a series of twisted links. It has been found from actual practice that these links do not prevent the vehicle from skidding or moving sidewise relative to the direction in which the machine is travelling or in other words, they are practically useless to prevent skidding.

The present invention, broadly considered, comprises a series of connected plates of considerable width, which are formed with rectangular shaped openings near their opposite ends. Intermediate of these openings there are located a plurality of projections which projections are similar in shape to the calk of a horse's shoe. These plates are connected together, end to end, by means of flat shaped links which substantially fill the rectangular shaped openings but permits each plate to bend or move relative to its adjacent plate thereby permitting the cross chain or device, as a whole to bend when placed transversely of the tire but will prevent the plates from being moved sidewise relative to each other, or in other words to accurately and constantly maintain the alignment of the series of plates. The inner surface of each of these plates is made slightly concave in order to more or less accurately fit the curvature of the tire. The extreme ends of the plates in which the rectangular shaped openings are formed extend slightly outward away from the surface of the tire when in use.

For the purpose of providing an effective non-skid plate, a web or rib is located between the projections and the transverse space between these webs is left open at its ends for the purpose of preventing the accumulation of dirt or other foreign matter from becoming packed tightly into the inclosed or recessed space which would in effect render the plate useless for the purpose for which it is intended.

Referring to the drawings.

Figure 1:
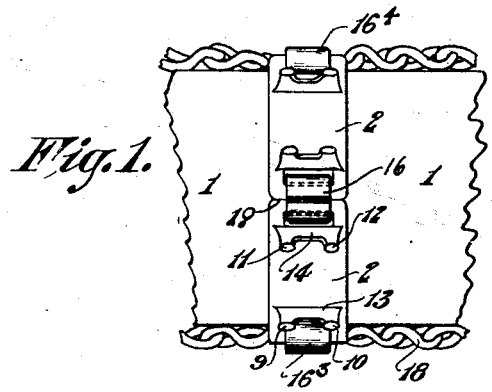
Fig. 1 is a plan view of a portion of the tread of a tire with several of the plates located across or transversely thereof.
Figure 3:
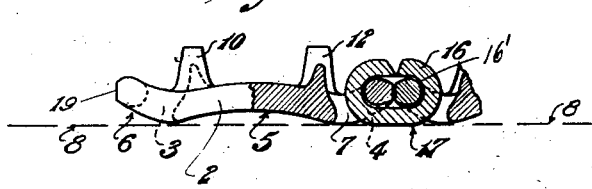
Fig. 3 is a partial sectional view of two of the plates clearly illustrating the flat links for coupling the adjacent plates together.
Figure 4:
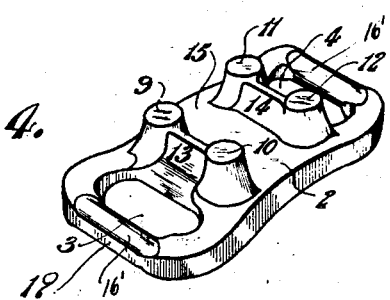
Fig. 4 is a perspective view of one of the plates removed or detached from the other plates.

Referring to the drawings in detail:

1 designates a portion of the tread of a tire; 2 the series of plates which form the main portion of the cross chain. These plates are each formed with rectangular or elongated shaped openings 3 and 4 near their opposite ends. The center portions of the plates 2 are made slightly concave as indicated in Fig. 3 at 5 and their opposite ends are curved slightly upward as shown at 6 and 7, as indicated with relation to the dotted line 8. 9, 10, 11 and 12 indicate projections which extend upward from the outer surface of the plates 2. These projections are substantially truncated cones. 13 and 14 designate ribs or webs which are integrally formed with the projections 9 and 10 and 11 and 12 respectively, as shown. These webs serve the additional purpose of not only strengthening the projections but they operate to prevent lateral or skidding movement of the vehicle when the upper ends of the projections have become worn down.

It will be noticed that the channel shaped space indicated at 15 between the webs 13 and 14 is left open at its ends. This construction prevents the accumulation of dirt or other substances which would render the projections useless as would necessarily be the case if their ends were closed.

Figure 2:
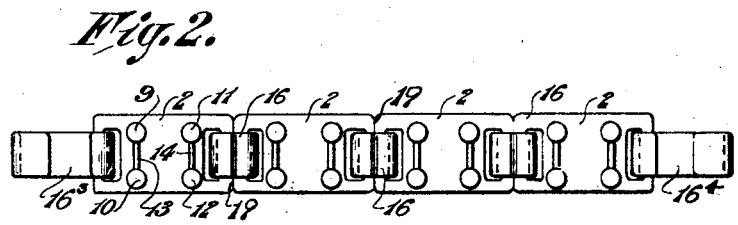
Fig. 2 is a plan view of the cross chain removed from the tire and illustrating the manner of connecting the plates together, end to end.

For the purpose of connecting the plates together, end to end flat links 16 are provided, the ends of which are passed through the elongated openings 3 and 4 as shown in Figs. 2 and 3 and around the curved surfaces 16' of the plates 2.

It should also be observed in Fig. 3 that the lower surfaces 17 of the flat links 16 are substantially in the same plane as the line 8. By employing links 16 which substantially fill the openings 3 and 4, it is evident that the plates 2 can not be moved laterally of their length but are permitted to bend freely over the curved surfaces of the tire and also to bend when in use. The series of plates 2 are attached to the side chains of the motor vehicle by means of the end links 163 and 164, the ends of which are bent to make the connection with the side chains, which side chains are indicated in Fig. 1 at 18.

The plates 2 are of substantial width to provide a broad bearing surface on the tire.

The extreme ends 19 of the adjacent plates contact with each other to prevent lateral displacement of the plate.

It is to be understood that I do not limit myself to the use of flat links for connecting the plates 2 together as other and analogous link structures may be employed as desired or found necessary for connecting the plates so that they may fold longitudinally.

What I claim is:

1. A plate for a non-skid tire chain comprising a member which is formed with a plurality of centrally located projections on its outer surface, transversely located webs for connecting the projections that are located adjacent the opposite ends of the plate but leaving a transversely located channel or passageway across the outer surface of the plate.

2. A plate for a non-skid tire chain comprising a member which is formed with two pairs of truncated projections on its outer central surface, transversely located webs for connecting the projections that are located adjacent the opposite ends of the plate but leaving a transversely located clear and unobstructed channel or passageway across the outer surface of the plate.

3. A plate for a tire cross chain which comprises a member that is slightly concave on its inner surface and its ends being curved outwardly, the member having truncated shaped projections on its outer side and webs connecting the said projections.

FRANK O. WELLS.